United States Patent [19]
Zhou

[11] Patent Number: 6,081,638
[45] Date of Patent: Jun. 27, 2000

[54] FIBER OPTIC HEADER WITH INTEGRATED POWER MONITOR

[75] Inventor: Ping Zhou, Glendale, Ariz.

[73] Assignee: Honeywell Inc., Morristown, N.J.

[21] Appl. No.: 09/119,089

[22] Filed: Jul. 20, 1998

[51] Int. Cl.[7] .............................. G02B 6/26; G02B 6/36; H01S 3/20

[52] U.S. Cl. ............................. 385/31; 385/88; 385/49; 372/50; 372/108

[58] Field of Search ................................. 385/31, 49, 88, 385/93; 372/50, 108

[56] References Cited

U.S. PATENT DOCUMENTS

| | | | |
|---|---|---|---|
| 4,130,343 | 12/1978 | Miller et al. | 350/96.15 |
| 4,165,496 | 8/1979 | Di Domenico, Jr. et al. | 331/94.5 |
| 4,381,882 | 5/1983 | Sabine | 350/96.2 |
| 4,403,273 | 9/1983 | Nishioka | 362/32 |
| 4,653,844 | 3/1987 | Ward | 350/96.15 |
| 4,865,417 | 9/1989 | Naohiro et al. | 350/96.3 |
| 4,981,334 | 1/1991 | Sniadower | 350/96.15 |
| 5,146,516 | 9/1992 | Blumke et al. | 385/36 |
| 5,163,113 | 11/1992 | Melman | 385/31 |
| 5,253,312 | 10/1993 | Payne et al. | 385/31 |
| 5,357,103 | 10/1994 | Sasaki | 250/227.24 |
| 5,390,271 | 2/1995 | Priest | 385/92 |
| 5,499,309 | 3/1996 | Kozuka et al. | 385/38 |
| 5,533,158 | 7/1996 | Han et al. | 385/88 |
| 5,724,464 | 3/1998 | Kazuka | 385/31 |
| 5,734,765 | 3/1998 | Artjushenko et al. | 385/31 |

OTHER PUBLICATIONS

Hong Koo Kim, et al. "Erbium–Doped Indium Oxide Films Prepared by Radio Frequency Sputtering," *Journal of Vacuum Science Technology,* vol. 12, No. 6, Nov./Dec. 1994, pp. 3154–3156.

John P. Wheeler, "Light–Emitting Polymers Are Ready for Prime Time," *Photonics Spectra,* Apr. 1997, pp. 131–133.

*Primary Examiner*—Cassandra Spyrou
*Assistant Examiner*—Fayez Assaf
*Attorney, Agent, or Firm*—Albert K. Kau

[57] ABSTRACT

An optical header for coupling a light source to an optical fiber is disclosed. The header preferably includes a ceramic substrate that has a recess for a vertical cavity surface emitting laser (VCSEL), or alternatively an edge emitting laser. An optical fiber is preferably attached to a ceramic substrate and terminates at a light source. The end of the fiber is preferably cleaved or polished to an angle such that light entering the fiber from the light source is substantially reflected into the fiber. A reflective coating is placed on the cleaved end of the fiber thereby permitting a small percentage of light to radiate away from the fiber and toward an intensity detector. The light preferably travels to the detector through a transmission medium such as a prism or an optical-grade epoxy. The header is particularly useful when used in conjunction with multiple fibers simultaneously to form an optical fiber array. The header is also useful to house an optical receiver, or to form a bi-directional header suitable for fiber optic communications.

37 Claims, 8 Drawing Sheets

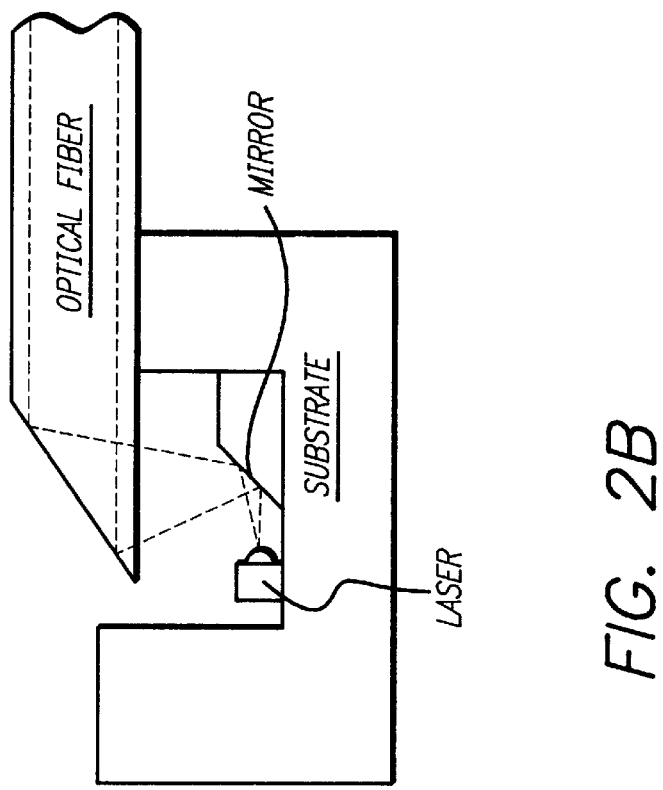
FIG. 2B *PRIOR ART*
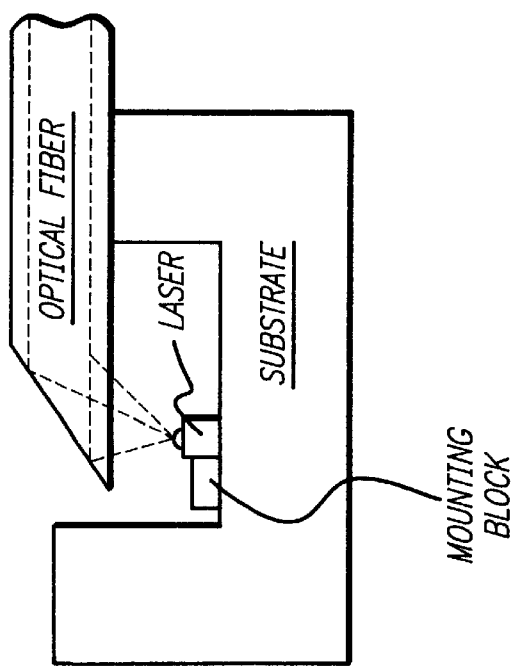
FIG. 2A *PRIOR ART*

FIBER OPTIC HEADER WITH INTEGRATED POWER MONITOR

FIELD OF THE INVENTION

The present invention relates generally to fiber optic communications. More particularly, the invention relates to a header arrangement for coupling light from a light source into an optical fiber, the header including a monitor for tracking the intensity of the light.

BACKGROUND OF THE INVENTION

Communications systems employing optical fibers are well known in the art. These systems typically transmit data by using a light source, such as a laser, to emit pulses of light onto a waveguide. The waveguide, often implemented as a glass fiber, transmits the light pulses to an optical receiver that senses the pulses of light and provides a corresponding output signal (typically an electrical signal) to a receiving system.

Optical communications systems may span large geographic regions, or they may be implemented within single electronic components. Recently, vertical cavity surface emitting lasers (VCSELs) have been recognized as being useful in small-scale communications systems. Indeed, it has been suggested that optical systems utilizing VCSELs may eventually replace many systems that currently rely upon copper wires to transmit electrical data signals. The advantages of optical communications systems over electrical systems commonly include high bandwidth and low signal loss which often results as optical data signals travel through the length of the fiber. Moreover, several optical fibers may be bundled together in a "fiber array" to form a communications channel that is capable of transmitting multiple signals simultaneously.

An important element of any optical communications system is a method of coupling light emanating from a light source into the waveguide. Typically, a laser light source is coupled into an optical fiber in a "header block" arrangement. The most commonly used form of header uses the well-known "butt coupling" method shown in FIG. 1. "Butt coupling" involves positioning the laser so that light is directly emitted into an end of the optical fiber. Typically, a substrate made of silicon, ceramic or another material supports the laser and at least a portion of the optical fiber. The "butt coupling" method is particularly suited for use with edge emitter lasers that emit photons in an elliptical pattern, with the vertical axis of the pattern being longer than the horizontal axis.

A common practice is to cut a groove into the substrate to support the optical fiber. Although the groove often prevents lateral movement of the fiber, it also typically increases the difficulty in aligning the fiber with the light source since the elliptical pattern of light emanating from the edge emitter is substantially narrow in the lateral direction. The grooves must therefore be precisely placed or else significant amounts of light can be lost, thus degrading the transmitted optical signals.

Often, the intensity of the light emitted by the laser is not constant over time.

For example, environmental effects such as temperature or humidity changes can affect the performance of the laser. To compensate for variations in laser output, it is frequently desirable to monitor the intensity of the light emitted by the laser. The intensity of the light is proportional to the output power of the laser, and the stability of the laser can be greatly improved by using the monitoring signal as feedback into the light source controls. This feedback signal is obtained by measuring the output intensity of the laser by a detector such as a photodiode and providing this signal to a well-known electronic feedback circuit that provides a drive signal to the laser as shown in FIG. 1.

Typically, it is impractical to measure the direct output of the laser, since an intensity detector cannot be placed between the laser and the optical fiber without significantly degrading the amount of light impinging upon the fiber. Many lasers, including edge emitting lasers, emit light at both the front and back ends of the lasing cavity, commonly called the front and back facets. The front facet is generally the primary output of the laser, with substantially fewer photons emanating from the back facet. Still, the light emanating from the back facet can provide an input to an intensity monitor in a feedback system. Using the back facet as an input to an intensity monitor, however, often results in two distinct disadvantages. First, the power output from the back facet is not always directly proportional to the light which enters the fiber from the front facet, since the relative intensities of light emanating from the front and back facets can vary over time. Moreover, VCSELs do not typically have a back facet. Therefore, it is not desirable to use a VCSEL in a buttcoupling arrangement with a power monitor.

U.S. Pat. No. 5,163,113, issued Nov. 10, 1992 to Paul Melman, which is incorporated herein by reference, generally discloses a second form of a header block arrangement that includes an edge emitting laser configured to provide light in a vertical direction. As can be seen in FIG. 2A, an untreated optical fiber is cleaved at about a 45 degree angle, and this cleave is positioned directly above an edge-emitting laser attached to a submount block so that emitted light substantially impinges upon the inner face of the cleaved end of the fiber. Alternatively, an edge-emitting laser directs light horizontally toward a mirror, and the mirror reflects light vertically toward the fiber as shown in FIG. 2B. Because the optical fiber is untreated, light from the laser is substantially reflected by the cleaved end into the longitudinal axis of the fiber. This arrangement provides several advantages over the butt-coupling method. Most notably, the header is suitable for use with vertically-emitting VCSEL lasers. Moreover, the cleaved fiber approach allows improved fiber/light source alignment over the butt-coupling approach. However, this approach often exhibits a marked disadvantage in that monitoring the output intensity of the laser light source is impractical. Moreover, the elements required to implement this method with an edge emitter (namely the submount block in FIG. 2A or the mirror structure in FIG. 2B) are cumbersome to manufacture.

Accordingly, there exists a need for an optical header arrangement that efficiently couples light from an emitter source into an optical fiber while providing a substantially accurate measure of the intensity of the emitted light. Moreover, there exists a need for such a header to incorporate VCSEL lasers, to handle bidirectional optical communications, and to support arrays of fibers that are used in communications systems. This header should contain minimal components to simplify manufacturing.

SUMMARY OF THE INVENTION

In accordance with a preferred embodiment of the present invention, a header arrangement for an optical communication system is provided which efficiently couples light from a light source into an optical fiber while monitoring the output power of the light source.

In accordance with one aspect of the present invention, a header arrangement is configured to accommodate vertical cavity surface emitting lasers (VCSELs) as light sources, and is suitable for use in a fiber array.

Particularly, a preferred embodiment of the invention includes a header block that supports a VCSEL or edge-emitting laser which emits light vertically toward an optical fiber. The end of the fiber is preferably formed into an angle of approximately 45 degrees and suitably placed in contact with a partially reflective coating. Light from the laser travels through the bottom surface of the optical fiber until the light impinges upon the inner side of the coated face of the fiber. Although the coating reflects most of the light along the longitudinal axis of the fiber, a small portion of the light transmits through the coating and into a transfer medium such as a glass prism. The medium transfers the light to a detector that suitably measures the intensity of the light and develops an output signal. Other embodiments of the invention employ alternate transfer media such as optical adhesives.

In accordance with a further aspect of the present invention, a header design is proposed which may be efficiently manufactured, and which may be conveniently coupled to a fiber array with a minimum of redundant parts.

BRIEF DESCRIPTION OF THE DRAWING FIGURES

The above and other objects, features and advantages of the present invention are hereinafter described in the following detailed description of illustrative embodiments to be read in conjunction with the accompanying drawing figures, wherein like reference numerals are used to identify the same or similar parts in the similar views, and:

FIG. 2A is an exemplary cross-sectional view of a prior art header block utilizing an edge emitter submount block;

FIG. 2B is an exemplary cross-sectional view of a prior art header block utilizing a micro-mirror to deflect light from an edge-emitting laser into an optical fiber;

DETAILED DESCRIPTION OF PREFERRED EXEMPLARY EMBODIMENTS

1. A Fiber Optic Header

Figure 1:
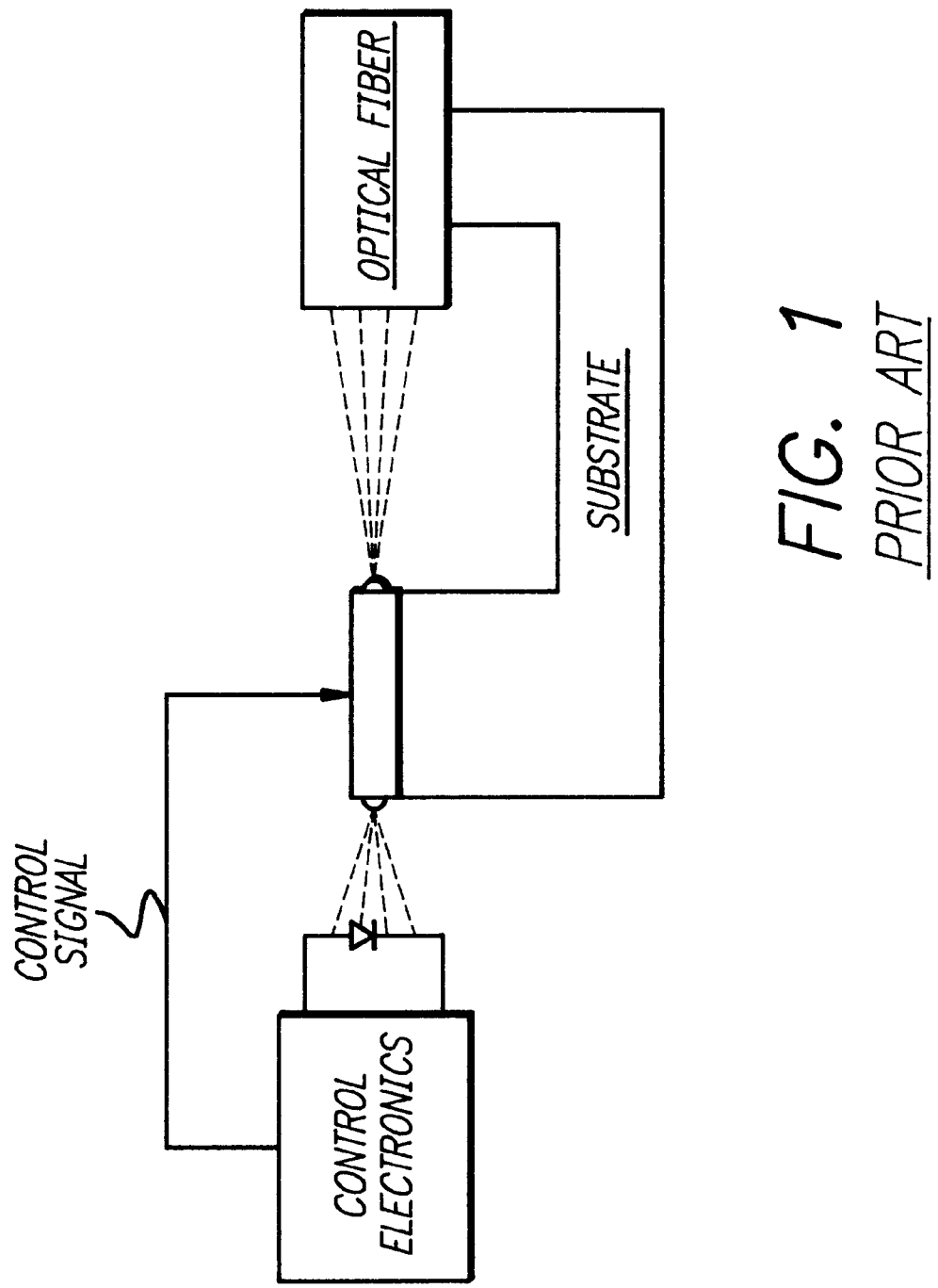
FIG. 1 is an exemplary cross-sectional view of a prior art header block utilizing the "butt coupling" method.

To simplify the description of the exemplary embodiments, spatial terms such as "above" and "below" will be used. These terms refer to the relative positions of elements in the drawings. Persons skilled in the art, however, should recognize that the header arrangement disclosed herein could be rotated or turned in many ways. Thus, the terms "above" and "below" merely describe the relative positions of the header components and should not be read as limiting the physical orientation of the invention.

Figure 3:
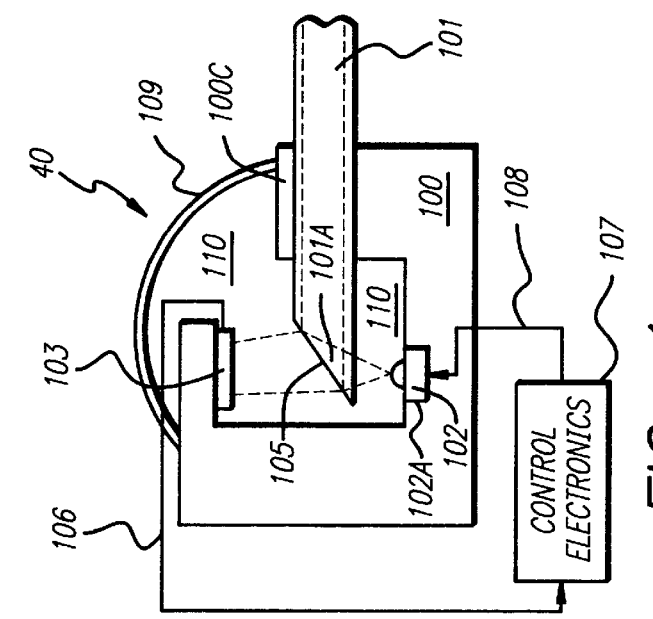
FIG. 3 is a cross-sectional view of a first exemplary embodiment of the present invention that includes a prism as a light transfer medium.

Referring to FIG. 3, a preferred embodiment of the present invention suitably includes a header arrangement 30 and a substrate 100 configured support the various elements of header 30, including an optical fiber 101 which is supported above a light source 102. Substrate 100 may be formulated of any well-known substrate material, including plastics or metals, and is preferably comprised of ceramic or silicon. Multiple substrate materials such as plastic and ceramic may be combined within a single header arrangement.

FIG. 3 shows an exemplary support structure that includes a lower "base" substrate 100A configured to support light source 102, and a secondary substrate block 100B configured to support optical fiber 101. Although these substrate components are shown as two separate elements, multiple substrate elements can be combined into a single structure. Similarly, additional substrate elements could be added. For example, it is frequently useful to increase the height of substrate 100D (to the left of the light source), particularly when hermetically sealing various header components together into an integral header structure. Substrate 100B (which supports the fiber above the light source) is constructed of any material suitable for use with the header arrangement. Moreover, optional upper substrate 100C may be configured to further support optical fiber 101. Upper substrate 100C may be comprised of the same material and of the same shape as the lower substrate elements. Alternatively, upper substrate 100C may comprise a glass plate covering some or all of header 30. In a preferred embodiment, grooves are etched or cut by known procedures into substrate 100B to accept optical fiber 101 and to prevent lateral movement of fiber 101 within its groove.

Header block 30 (shown in FIG. 3), and particularly substrate 100B, is suitably configured to support any type of optical fiber 101. Optical fiber 101 may be comprised of any well-known optical glass or plastic, and may be suitably implemented in a single-mode, multi-mode, or any other type of wellknown optical fiber. The outer jacket is suitably removed from the section of fiber 101 interfacing with header block. For simplicity, only the core of fiber 101 is shown in the figures. In this regard and with momentary reference to FIG. 8, this core may include several layers, e.g. an inner core 112 with a high index of refraction and a surrounding outer core 113 with a comparatively lower index of refraction. In the context of the present invention, it is generally desirable to focus the bulk of emitted light upon inner core 112.

Figure 5:
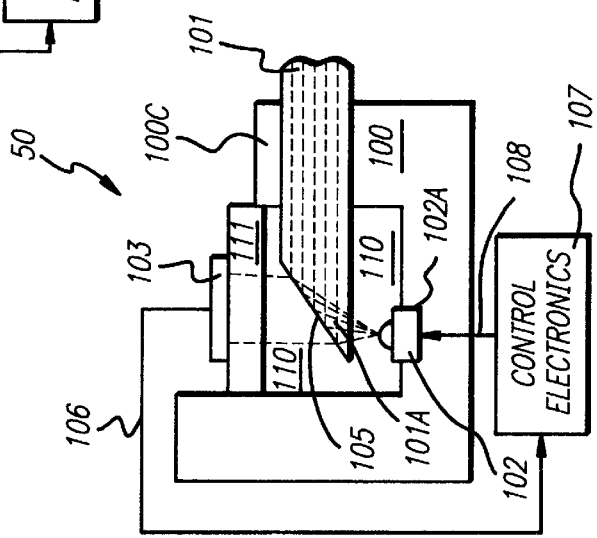
FIG. 5 is a cross-sectional view of a third exemplary embodiment of the present invention that includes a chamber filler and a glass plate as light transfer media.
Figure 4:
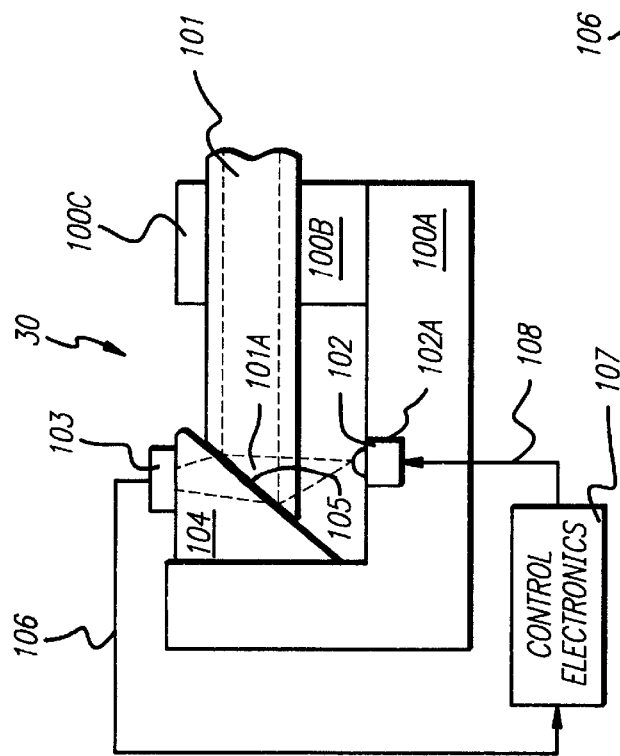
FIG. 4 is a cross-sectional view of a second exemplary embodiment of the present invention that includes a chamber filler as a light transfer medium.

Referring again to FIG. 3, light source 102 is affixed to substrate 100, preferably (although not necessarily) through the use of a mounting structure. This mounting structure is preferably a cavity or recess in which the light source may be placed (such as cavity 102A in FIG. 3) or, alternatively, an outcropping or mounting block (not shown) to which the light source may be attached. In a preferred embodiment, light source 102 is a VCSEL and substrate 100A includes a recessed area 102A. The VCSEL is inserted into area 102A such that the emitting end of the VCSEL points upward and out of the cavity. The VCSEL or other light source 102 can preferably be secured within the substrate 100 with an optical grade adhesive such as an epoxy, as described below. An exemplary light source suitable for use in conjunction with the present invention may comprise a VCSEL laser chip available from the Microswitch division of Honeywell Inc. of Richardson, Tex. In some embodiments, light source 102 is in direct contact with optical fiber 101. Preferably, however, a gap is present between light source 102 and fiber 101 to avoid scratching light source 102, as shown in FIGS. 3–5.

In an alternative embodiment, light source 102 may comprise an edge emitting laser, affixed to substrate 100 through a mounting block (not shown) attached to the substrate. Since optical fiber 101 is physically located above the light source and preferably directly above light source 102, the edge emitter may be advantageously situated such that the photons are emitted upwardly toward the fiber. Alternatively, photons can be emitted toward a mirror or focusing lens which is suitably configured to direct the photons upward to the fiber, similar to the prior art header shown in FIG. 2B. Other preferred embodiments using edge emitting lasers are discussed below.

End 101A of optical fiber 101 is preferably fashioned into a suitable angle by polishing, cleaving, or the like. The particular angle is suitably selected such that light from light source 102 will substantially impact upon the inner surface of the cleaved end 101A and will substantially reflect along the longitudinal axis of the fiber, as shown in FIG. 3. For a more exhaustive discussion at the reflection of light into a fiber, see U.S. Pat. No. 5,163,113, previously incorporated by reference. When light source 102 is perpendicularly oriented with respect to the axis of the fiber and below end 101A of fiber 101, the angle of the cleave is suitably in the range of 30 to 60 degrees, and most preferably about 45 degrees, such that light moving vertically is deflected by about a 45 degree angle to travel horizontally along the fiber axis. The particular angle selected may vary from implementation to implementation; however, the angle should preferably be selected to ensure that the light entering optical fiber 101 is ultimately reflected to travel along the longitudinal axis of optical fiber 101.

End 101A of fiber 101 is preferably placed in contact with a partially reflective coating 105 such as a dielectric or metal. As is known in the art, silver, gold, chromium and tin are particularly effective reflectors that may be used as a coating. Alternatively, multiple layers of one or more dielectric materials may be deposited on fiber end 101A. In a preferred embodiment, end 101A is treated with a single layer of gold or silver that is preferably mixed with chromium to form coating 105. The thickness of coating 105 varies depending upon the particular implementation, as discussed below, with a thicker coating causing more photons to reflect. Optimally, coating 105 is such that approximately 80–90%, and most preferably about 90–95% of the light reflects, and about 1–20% (and preferably about 5–10%) of the light transmits through the coating 105.

Light intensity detector 103 is preferably located above fiber 101 and aligned to capture light emitted by light source 102 and transmitted through coaxing 105. This intensity detector (also called a "power monitor" inasmuch as light intensity is proportional to the power of the light) provides a signal 106 that is proportional to the number of photons impinging upon the sensor face. In a preferred embodiment, signal 106 is an electrical signal. An example of an intensity detector suitable for use in the context of the present invention may comprise a PIN photodetector, although virtually any light intensity detector that is responsive to the type of light produced by light source 102 could be used.

Light that is not reflected by partially-reflective coating 105 is substantially transmitted to detector 103 through a suitable medium. Although air may be a sufficient medium for some purposes as described below, preferably a known glass element or prism such as element 104 (see FIG. 3) is used. Prism 104 is suitably cut, polished, or otherwise fashioned to fit tightly against the cleaved face 101A of the fiber so that minimal light escapes between fiber 101 and prism 104. As an alternative to placing partially reflective coating 105 on end 101A of optical fiber 101, coating 105 may be placed on prism 104 which communicates light to edge 101A of fiber 101 when prism 104 is mounted into header block 30. Stated another way, the header generally functions satisfactorily regardless of whether the coating is first placed on either or both of prism 104 and fiber end 101A.

The header arrangement disclosed above efficiently couples light from light source 102 into optical fiber 101 and provides a power monitor signal 106. When end 101A of optical fiber 101 is placed above light source 102, photons leaving the light source enter optical fiber 101 from the bottom of end 101A. These photons travel upward through end 101A until they reach reflective coating 105. The coating, in combination with the angle of fiber end 101A, causes a substantial portion of the photons to reflect along the length of fiber 101 toward an optical receiver (not shown). Most photons that are not reflected are transmitted through coating 105, for example through conducting prism 104 and into intensity detector 103.

As noted above, detector 103 provides an output signal 106 that is a function of the number of photons impinging upon detector 103. Output signal 106 is preferably an electrical signal that can be used as feedback to control electronics 107 which are suitably configured to produce control signal 108 which, in turn, suitably adjusts light source 102 to an optimal setting for producing optical signals to be transmitted on fiber 101. By using feedback from detector 103, the stability of light source 102 and, therefore, the performance of the optical system is greatly enhanced.

Referring now to FIG. 4, a second embodiment of a header arrangement 40 is shown. In this embodiment, an optical fiber 101 and a light source 102 are suitably configured in a manner similar to that discussed above in connection with FIG. 3. End 101A of fiber 101 is preferably cleaved or polished at an angle, and light from a light source 102 (which is preferably a VCSEL, edge emitting laser, or other type of laser) radiates upward through fiber 101 where the light is partially reflected and partially transmitted into fiber 101 by a reflective coating 105 on the outer surface of the fiber end 101A. In this embodiment, however, the internal region 110 of header block 100, and most particularly the region surrounding end 101A of the fiber, is suitably filled with a clear encasement material, for example an optical grade adhesive or epoxy such as EPO-TEK model 353ND epoxy available from the Epoxy Technology Inc. corporation of Billerica, Mass. Alternatively, region 110 could be filled with an ultravioletcured cured optical glue. As shown in FIG. 4, a suitable barrier layer 109, which may be made from plastic, metal or the like, may be configured to contain and secure the resin or other stabilizing material within region 110 by forming a substantially hermetic seal between barrier 109 and header block 100. In this embodiment, light is transmitted from end 101A of the fiber to the photo detector 103 via the stabilizing medium; consequently, the prism or other light conducting medium may be omitted, as desired.

In a further alternative embodiment, the epoxy in chamber 110 with may be replaced air or other suitable gaseous medium; alternatively, chamber 110 may be evacuated. In these embodiments, reflective coating 105 is optional since the interface between the fiber and the gas/vacuum along fiber edge 101A will reflect most of the light into fiber 101, with a small amount of light nonetheless escaping fiber 101 and reaching photodetector 103. In the exemplary embodiment of FIG. 4, however, an epoxy in chamber 110 is highly preferred over air or vacuum since substantially more light reaches photodetector 103 in the presence of the epoxy. The epoxy is further advantageous in that it protects the various components of the header and holds the components together. Indeed, in an alternative embodiment, it is often desirable to fill the gaps in the header shown in FIG. 3 with an epoxy to prolong the life of the header.

FIG. 5 shows an example of combing the concepts illustrated in FIGS. 3 and 4. Header 50 shown in FIG. 5 preferably includes an epoxy (or air) filled chamber 110 below a glass plate 111. The glass plate 111 may be analogous in function to the prism shown in FIG. 3. Light transmitted through and 101A (with or without the use of a partially-reflective coating 105) is conducted through the epoxy-filled chamber 110 to glass plate 111, which then conducts light to detector 103.

Figure 6B:
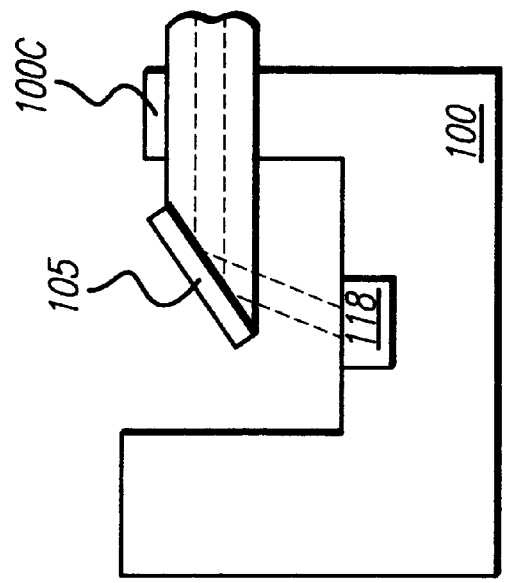
FIG. 6B is a cross-sectional view of an exemplary embodiment of the present invention that includes an optical receiver and a mirror.
Figure 6A:
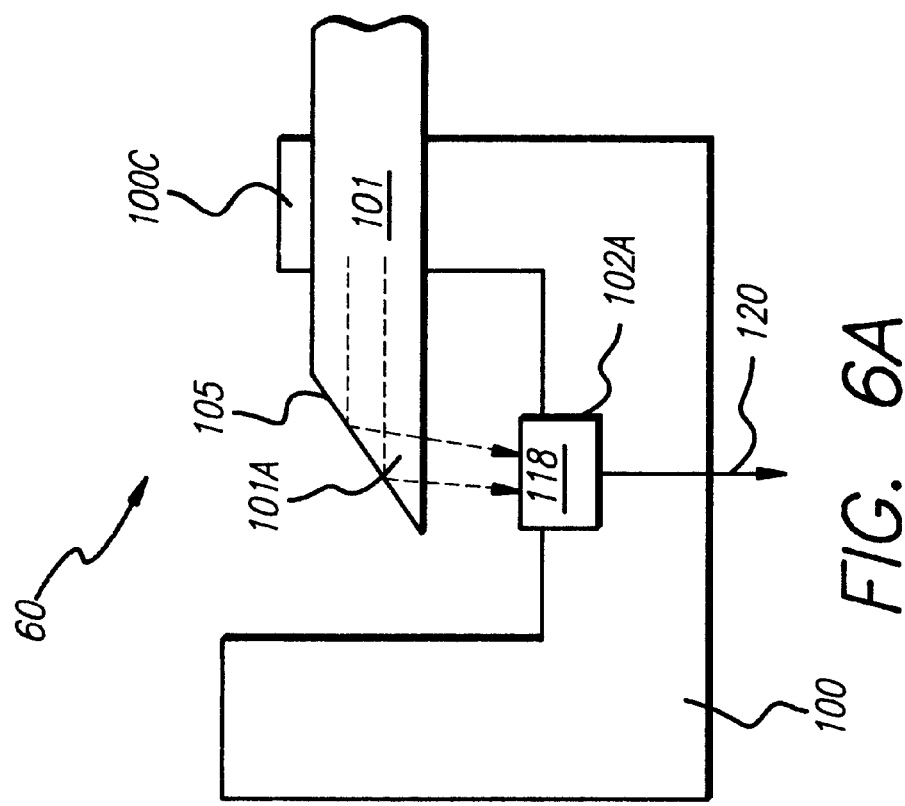
FIG. 6A is a cross-sectional view of an exemplary embodiment of the present invention that includes an optical receiver.

FIG. 6A shows an exemplary header 60 suitable for use as a receiver in an optical communications system. Exemplary header 60 includes a detector 118 that receives optical signals transmitted along fiber 101 and provides an output signal 120. As can be seen from FIG. 6A, fiber 101 has an end 101A that is angled to deflect light toward detector 118. That is, light traveling on fiber 101 impacts upon reflective coating 105 that is present upon fiber end 101A and is deflected downward toward the optical detector 118. In an alternative embodiment, reflective surface 105 is implemented as a mirror or micromirror as shown in FIG. 6B. By replacing optical receiver 118 with a light source such as a VCSEL or edge emitter, the header shown in FIG. 6B could also be used as a transmitter. Similarly, mirrors could be used in other embodiments of the invention, particularly in those embodiments that do not require power monitors, since mirrors are generally inexpensive and easy to manufacture.

Figure 7A:
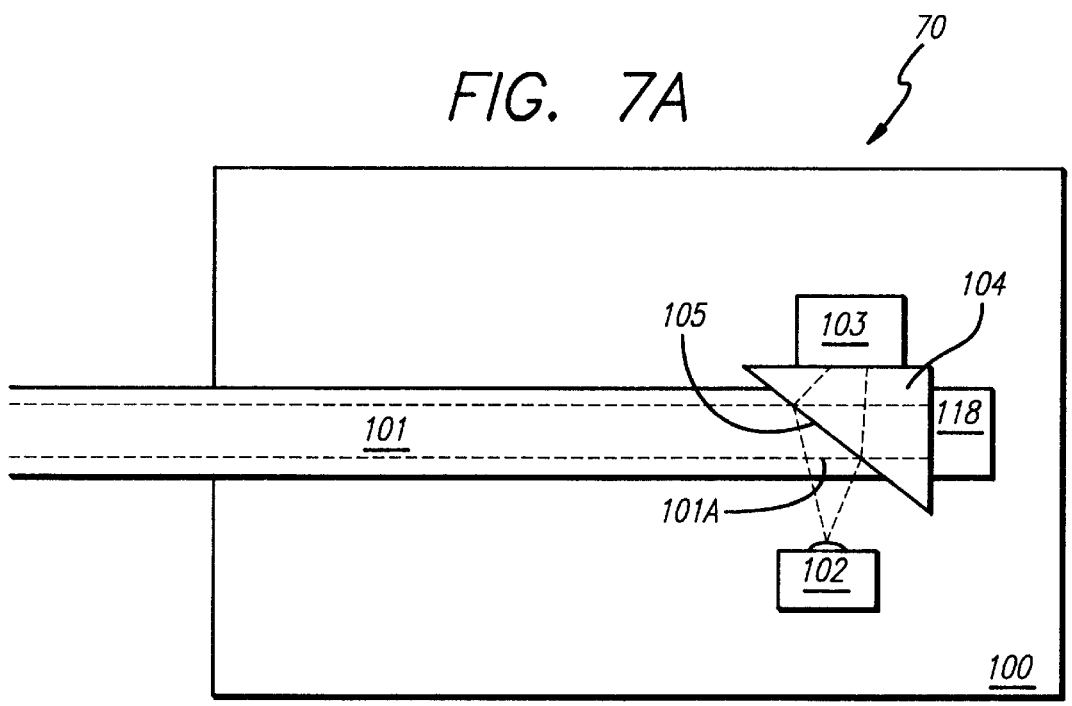
FIG. 7A is a top-down view of an exemplary embodiment of the present invention that is suited for bidirectional optical communication.
Figure 7B:
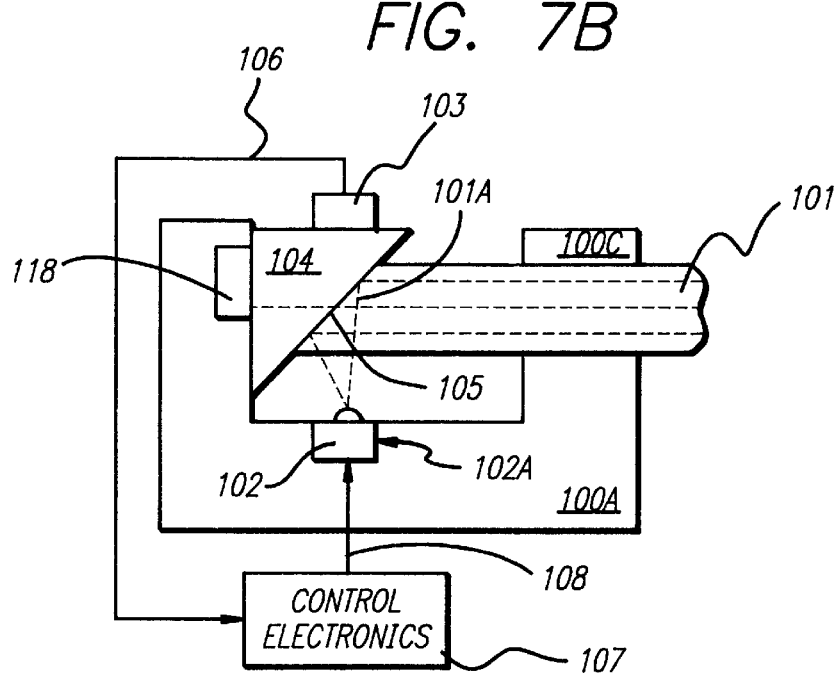
FIG. 7B is a cross-sectional view of an exemplary embodiment of the present invention that is suited for bidirectional optical communication.

A more elaborate exemplary embodiment that is suitable for use in a bi-directional communications system is shown in FIG. 7A. A bidirectional communications system includes a fiber 101 that is capable of transmitting optical signals in two directions. Such a system requires headers on each end of the fiber that are capable of both transmitting and receiving optical signals. Exemplary header system 70 shown in FIG. 7A includes a light source 102 that provides optical energy to an angled end 101A of an optical fiber 101 as described in the embodiments associated with FIGS. 3, 4 and 5. A partially reflective surface 105 is preferably (but not necessarily) present between the fiber end 101A and a transmitting medium 104 such as a prism. As in the previous embodiments, most of the light from light source 102 is reflected into fiber 101 and transmitted to a remote receiver. Some of the light, however, is transmitted through the coating 105 and medium 104 to a power monitor 103 that is capable of providing an output signal (not shown) indicative of the intensity of light output by light source 102. Also present in bi-directional header 70 is an optical receiver 118 that is capable of receiving optical signals from a remote optical transmitter (not shown). When optical signals are received along fiber 101, they encounter coating 105, which deflects a portion of the light downward toward light source 102. Light that is not reflected transmits through coating 105 and medium 104 before reaching optical receiver 118. In preferred alternative embodiments, coating 105 is wavelength selective such that light received from the remote optical transmitter substantially transmits through the coating, yet light emanating from light source 102 is at least partially reflected, as discussed herein. Any wavelength selective coating such as single or multiple layers of dielectric material could be used to implement coating 105. Because header 70 includes apparatus for transmitting and for receiving optical signals, header 70 is suitable for use in a bidirectional optical communications system. FIG. 7B shows another exemplary embodiment of a bidirectional header that is preferably suited for use with a VCSEL light source. Similarly, an optical receiver 118 and/or a wavelength sensitive coating 105 could be incorporated into other embodiments within the scope of the invention, including those embodiments disclosed in FIGS. 3–5.

2. Edge Emitting Lasers in a Fiber Optic Header

Figure 8A:
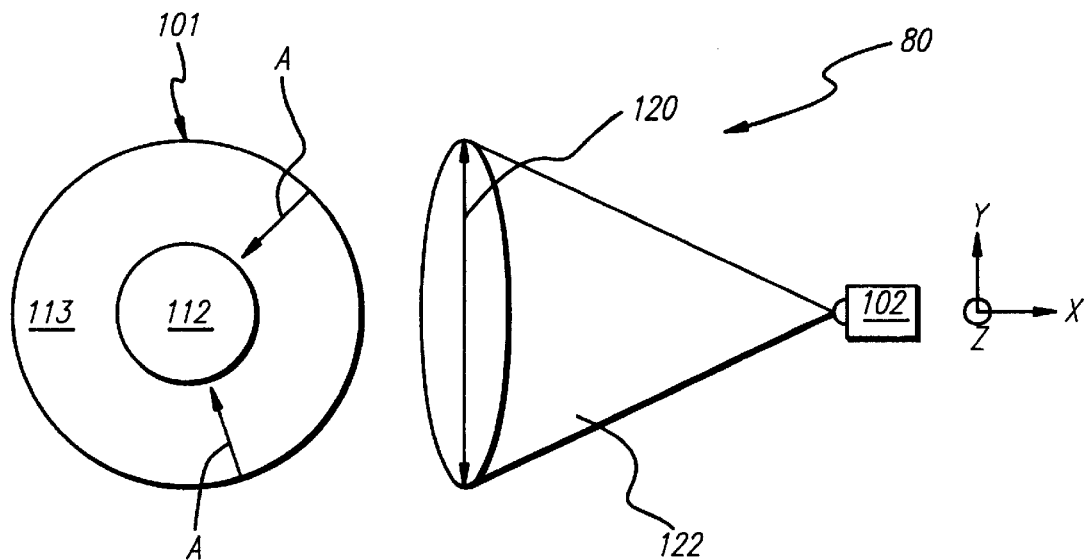
FIG. 8A is a side view of an exemplary embodiment of the invention using an edge emitter laser.
Figure 8B:
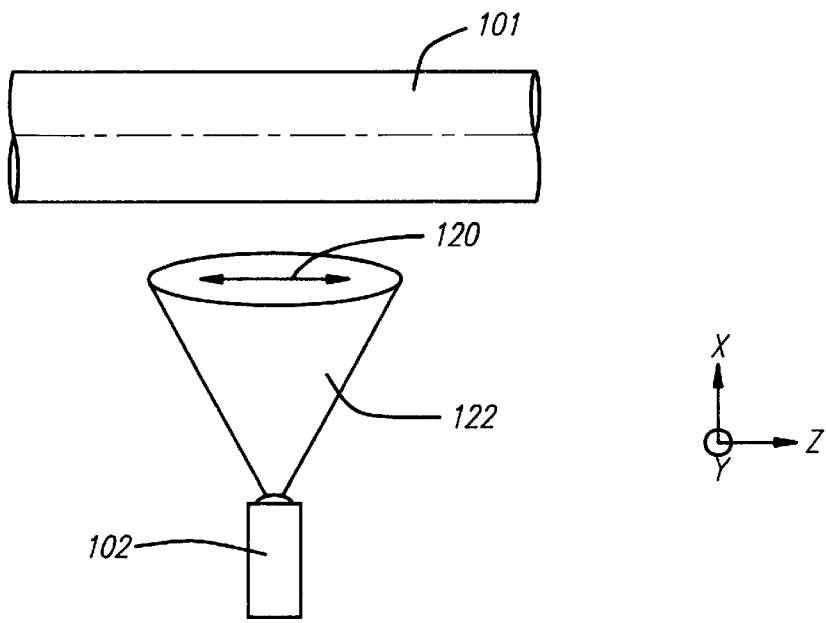
FIG. 8B is a side view of a an embodiment using an edge emitter laser in a parallel alignment to the optical fiber.

As noted above, photons emitted by an edge emitting laser form an elliptical pattern. Referring now to FIG. 8A, edge emitter 102 is preferably configured such that the elongated axis 120 of the emitted light pattern 122 is perpendicular to the longitudinal axis of optical fiber 101 (i.e. axis 120 is orthogonal to the Z axis and parallel to the Y axis of FIG. 8A). This perpendicular alignment is contrary to conventional wisdom (shown in FIG. 8B), which holds that light is best coupled from source 102 to inner core 112 when axis 120 is parallel to the fiber. It has been observed, however, that outer core 101 of the fiber will refract photons toward the inner core 112 (as shown by arrows A in FIG. 8A) due to the lens-like refracting properties of the barrier between outer core 113 and the surrounding medium (such as air or epoxy). This refraction has the effect of focusing photons from the outer reaches of ellipse 120 onto inner core 112. Stated another way, the bulk of the photons emitted by light source 102 are observed to reach inner core 112 even when axis 120 is situated perpendicular to the longitudinal axis of the fiber as shown in FIG. 8A.

Referring again to FIG. 8A, an edge emitting laser 102 is arranged such that the longer axis of the elliptically-shaped emission pattern (which runs parallel to the Y-axis in the figure) is perpendicular to the longitudinal axis of the optical fiber (which comes out of the page as shown in the figure). As the photons impinge upon the glass of the outer core 113 of the fiber, most of the photons are inwardly refracted (see Arrows A) because the glass is more dense than the surrounding air or other material. The inward refraction causes the photons to be deflected toward inner core 112. Thus, edge emitter beam 122 is suitably matched to optical fiber 101. This arrangement of the edge emitter laser may be incorporated into the various embodiments of the invention to improve the coupling efficiency of the header.

The perpendicular arrangement of axis 120 provides an added advantage over a parallel arrangement in that the perpendicular arrangement simplifies the alignment of light source 102 to optical fiber 101. Aligning the light source 102 to optical fiber 101 generally requires extreme precision. With respect to the parallel arrangement, movement of fiber 101 is generally restricted in the lateral direction (i.e. in the Y direction shown in FIGS. 8A and 8B) by a groove cut into substrate 100. When axis 120 is parallel to fiber 101 (as in FIG. 8B), alignment is difficult because beam 122 has little margin for error in the Y direction. By placing axis 120 perpendicular to fiber 101 as shown in FIG. 8A, however, a greater margin of error with regard to lateral (Y direction) motion of the fiber is allowed. Therefore, a preferred exemplary method of aligning fiber 101 to light source 102 includes etching a groove in substrate 100 that is aligned with a previously-placed light source 102, and then placing optical fiber 101 within the groove. Aligning the end 101A of fiber 101 to the light source is preferably achieved by sliding fiber 101 within the groove cut in substrate 100 (i.e. by moving the fiber in the Z direction of FIG. 8A). Thus, it is desirable to align edge emitter 102 such that the longer axis 120 of the elliptical photon pattern is substantially perpendicular to the longitudinal axis of optical fiber 101 because such alignment generally facilitates mechanical alignment of fiber 101 to light source 102.

3. A Header for a Fiber Array

Figure 9:
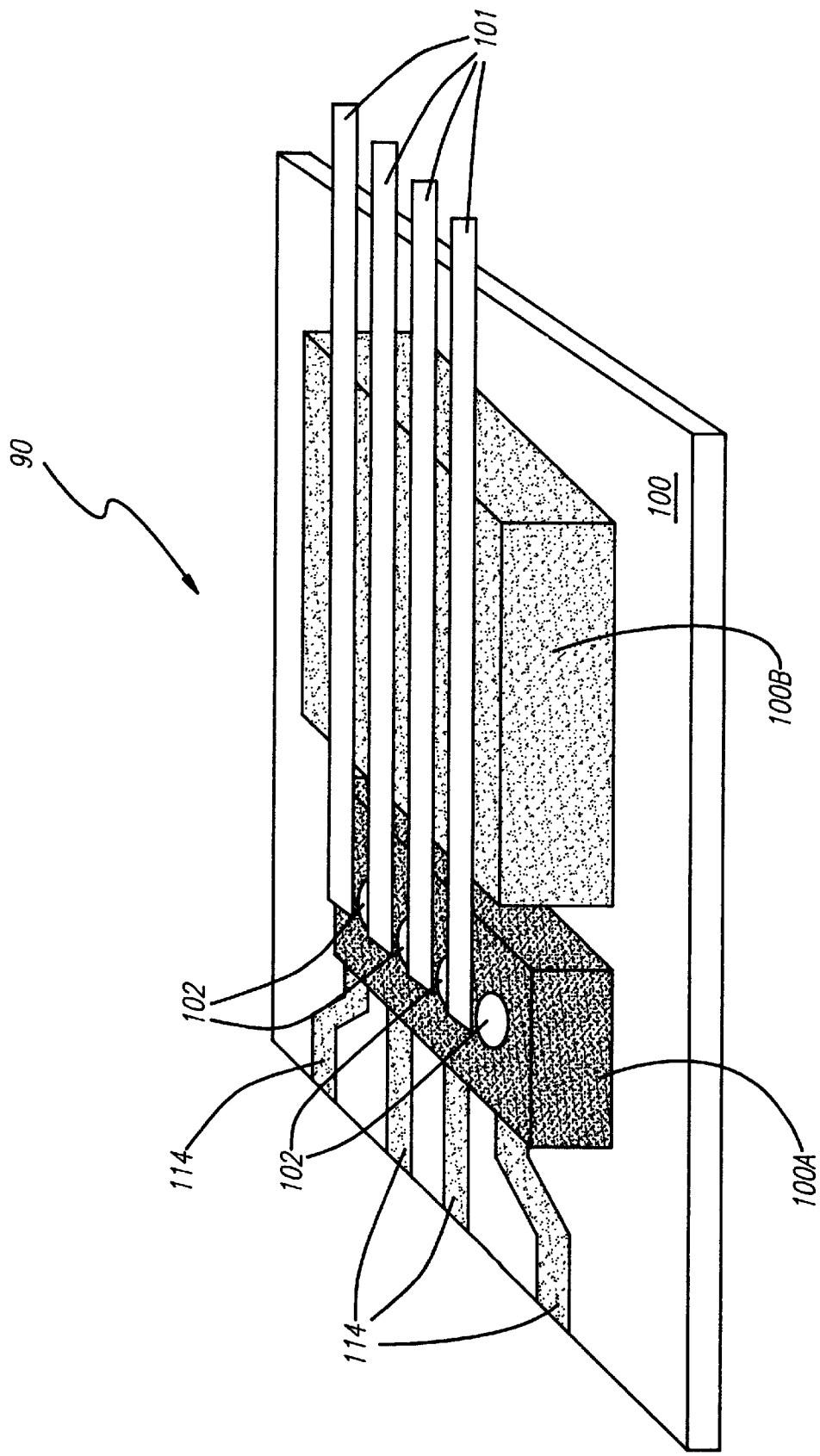
FIG. 9 is a perspective view of an exemplary incomplete header block of the present invention as implemented in a fiber array.
Figure 10:
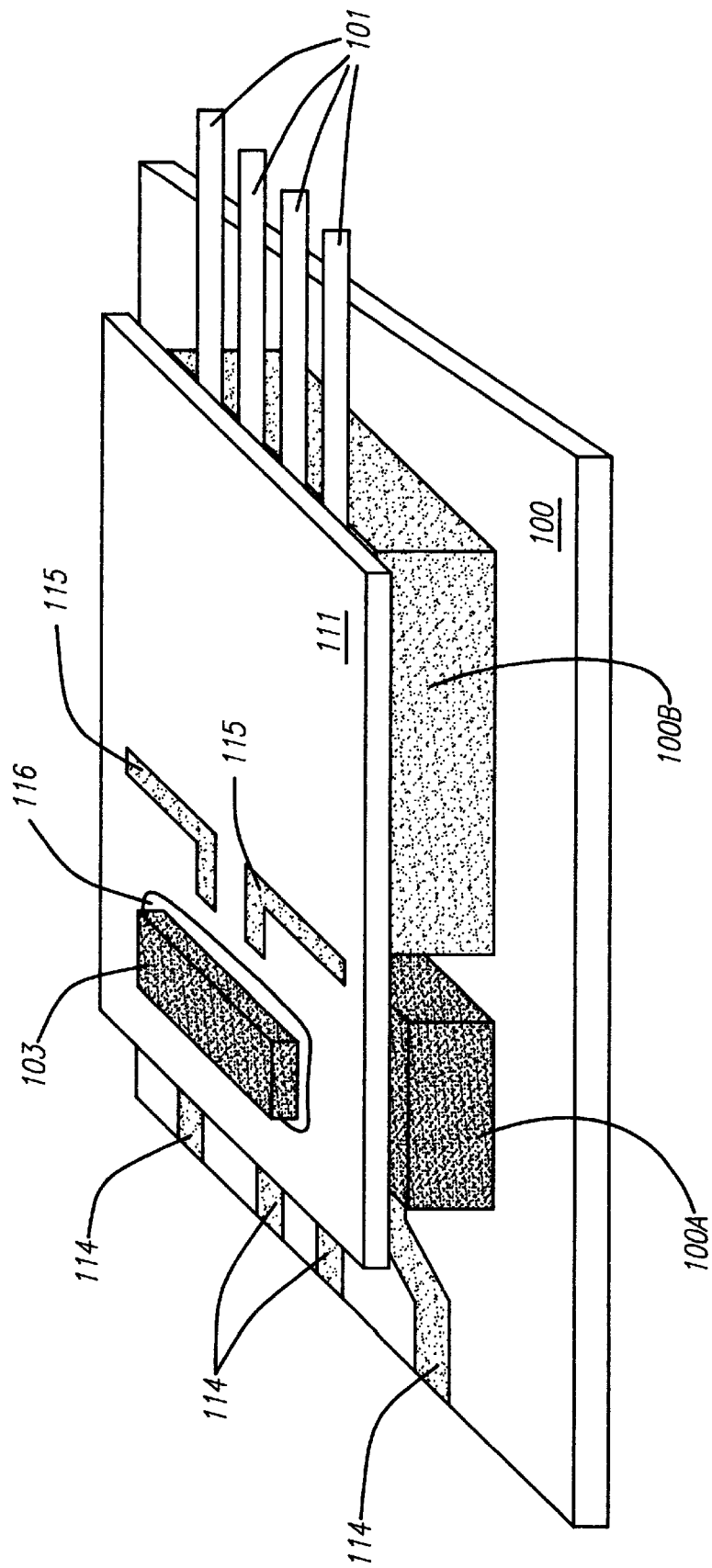
FIG. 10 is a perspective view of an exemplary header block of the present invention as implemented in a fiber array.

FIGS. 9 and 10 show perspective views of a header for a fiber array in accordance with a preferred embodiment of the present invention. The uppermost elements of the array (elements 103, 111, 116) have been removed in FIG. 9 to show the detail of the fiber/light source connection. The header shown in these drawings suitably couples multiple light source module 102 to multiple optical fibers 101, and preferably includes at least one intensity detector module 103 for monitoring the light emitted by the respective light sources comprising module 102.

Referring now to FIG. 9, a parallel submount assembly 90 for four optical fibers 101 is shown. A base layer of the substrate 100 preferably includes a metal trace 114 for each light source. These traces suitably act as electrodes that provide drive currents to light sources 102. Although the light sources 102 may receive electrical power in any way, the traces 114 embedded in substrate 100 provide a convenient, compact and easy-to-manufacture electrical conduit.

The base substrate in FIG. 9 also supports two secondary substrate blocks, one block (100A) surrounding the light sources (e.g. VCSEL light sources) and another block (100b) supporting the optical fibers. As discussed above, these substrate blocks may be implemented in any number of ways. The substrate could be formed as a single block, for example, or could be divided into many sub-blocks. However, the light sources 102 and optical fibers 101 are preferably supported by a single substrate structure 100 as shown.

The light sources 102 such as VCSELs or other laser light sources are suitably embedded within cavities formed in the substrate 100A, and the angled ends of optical fibers 101 are aligned directly above the emitting ends of the light sources. The ends of fibers 101 are preferably cleaved or polished to about 45 degree angles, but, as discussed above, the angle of the fiber depends upon the angle between the impinging light and the longitudinal axis of the fibers. The ends of fibers 101 are placed in contact with a partially reflective coating (not shown) so that most of the incoming light reflects along the length of fiber 101, but a portion transmits through fiber 101 to an intensity detector (not shown in FIG. 9).

Referring now to FIG. 10, the upper layers of the fiber array header 100 are shown. Light escaping from the end of fibers 101 is transmitted to detector 103 by a glass plate 111. The glass plate shown in the figure lies on top of the header block, but many alternative embodiments could be incorporated by one skilled in the art. For example, a triangular glass prism could be used in place of glass plate 111. The triangular prism aligns closely with the cleaved ends of fibers 101, and therefore transmits light to detector 103 very effectively. In the embodiment shown, the gaps between the ends of optical fibers 102 and glass plate 111 are preferably filled with an optical grade epoxy to aid in light transmission, similar to the arrangement disclosed in connection with FIG. 5.

Detector 103 receives light transmitted through glass plate 1 11 from the optical fibers 102 and provides a feedback signal (not shown) to indicate the relative power of the light received. The signal can be transmitted through metal traces 115 on glass plate 111, or through a bonding wire connected to detector 103, or through any other known current conducting means. Detector 103 shown in FIG. 10 may be a single photodetector, or may comprise multiple photodetectors. If detector 103 is a single photodetector, then the signal output will preferably indicate the typical power of light reaching the detector from a representative light source 102. Alternatively, the output from detector 103 could indicate the total power of all of the light reaching detector 103 from all of the light sources 102 combined. If the detector comprises multiple photodetectors, then it is highly desirable to place an aperture 116 in the glass plate to prevent scattering of light from one light source onto a photodetector associated with another light source. Aperture 116 is preferably a metallic coating with an opening that is optically transparent.

In summary, an integrated header arrangement for a fiber optic communications system is disclosed. More particularly, a header for coupling an optical fiber to a light source that includes an integrated power monitor for tracking the intensity of light emanating from the source is disclosed. The header arrangement is particularly well-suited for use with vertical cavity surface emitting lasers (VCSELs), as well as in systems using arrays of multiple optical fibers.

The corresponding structures, materials, acts and equivalents of all elements in the claims below are intended to include any structure, material or acts for performing the functions in combination with other claimed elements as specifically claimed. The scope of the invention should be determined by the appended claims and their legal equivalents, rather than by the examples given above.

The claimed invention is:

1. A header for use in an optical communications system, the header comprising:
   a light source capable of generating a light; and
   an optical fiber having a partially reflective end, the optical fiber being aligned such that the partially reflective end is located proximate to the light source; and
   a detector configured to provide an output signal based upon transmitted light from the fiber;
   wherein the light source is aligned with the fiber such that the light impinges on an inner surface of said partially reflective end such that a first component of the light reflects substantially along a longitudinal axis of said optical fiber and a second component of the light is transmitted through the partially reflective end to the detector.

2. A header of claim 1 wherein the partially reflective end is formed at an angle.

3. A header of claim 2 wherein the angle is substantially equal to 45 degrees.

4. A header of claim 1 further comprising a transmitting medium, located between the partially reflective end of the optical fiber and the detector, for conducting the second component of light to the detector.

5. The header of claim 4 wherein the transmitting medium comprises glass.

6. The header of claim 4 wherein the emitting medium comprises adhesive.

7. The header of claim 6 wherein the adhesive is an epoxy.

8. The header of claim 6 wherein the adhesive is an ultraviolet-cured optical glue.

9. The header of claim 1 further comprising feedback electronics capable of receiving the output signal from the detector and of providing a drive signal to the light source that is responsive to said output signal.

10. The header of claim 1 wherein said substrate comprises a recessed area to receive the light source.

11. The header of claim 4 wherein said light source is a vertical cavity surface emitting laser.

12. The header of claim 4 wherein said light source is an edge emitting laser.

13. The header of claim 1 further comprising an optical receiver proximate to the partially reflective end of the optical fiber, the optical receiver being capable of receiving optical signals from a remote optical transmitter through the partially reflective end.

14. The header of claim 13 wherein the optical receiver provides an output communications signal that is responsive to the optical signals.

15. The header of claim 2 further comprising an optical receiver proximate to the partially reflective end of the optical fiber, the optical receiver being capable of receiving optical signals from a remote optical transmitter through the partially reflective end.

16. The header of claim 4 further comprising an optical receiver proximate to the partially reflective end of the optical fiber, the optical receiver being capable of receiving optical signals from a remote optical transmitter through the partially reflective end.

17. The header of claim 16 wherein the optical receiver provides an output communications signal that is responsive to the optical signals.

18. A method of coupling light emanating from a light source to an optical fiber, the method comprising the steps of:
   providing the light source and a detector on opposing sides of the optical fiber;
   aligning the optical fiber such that the light emanating from the light source impinges upon an inner reflective surface of the optical fiber, forming a first light component that is reflected substantially along the longitudinal axis of the optical fiber and a second light component that is transmitted through the inner reflective surface;
   conducting the second light component to the detector; and
   monitoring an output signal provided by the detector that is indicative of the intensity of the light emanating from the light source.

19. The method of claim 18 wherein the second light component is conducted to the detector by a prism.

20. The method of claim 18 wherein the second light component is conducted to the detector by an adhesive.

21. The method of claim 20 wherein the adhesive is an optical grade glue.

22. The method of claim 21 wherein the optical grade glue is an epoxy.

23. The method of claim 18 wherein the second light component is conducted to the detector by air.

24. The method of claim 18 further comprising the step of providing a control signal to the light source that is based upon the output signal provided by the detector.

25. A header block for an optical fiber array comprised of a plurality of optical fibers, each optical fiber having a partially reflective end forming a reflective inner surface, the header block comprising:
   a plurality of light sources, each light source being associated with one of said optical fibers; and
   at least one detector, each detector being associated with at least one light source; the at least one detector is configured to provide an output signal based upon transmitted light from at least one light source;
   wherein each light source is aligned with one of said optical fibers such that light from each of said light sources impinges upon the inner reflective surface of the associated optical fiber, forming a first light component that is reflected substantially along a longitudinal axis of the optical fiber and a second light component that is transmitted through the inner reflective surface to the associated at least one detector.

26. A header block of claim 25 further comprising at least one aperture between said optical fibers and said detectors for isolating said second light components to an associated detector.

27. The header block of claim 25 further comprising at least one glass element disposed between said optical fibers and said detectors for transmitting said second light components to said detectors.

28. A header of claim 27 further comprising at least one aperture between said at least one glass element and said detectors for isolating said second light components to an associated at least one detector.

29. The header of claim 27 wherein said glass element is a glass plate.

30. The header block of claim 29 further comprising an aperture disposed between said glass plate and said plurality of detectors for isolating said second light components to the associated detector.

31. The header of claim 27 wherein said glass element comprises a beveled surface substantially matched with the optical fibers.

32. A header for a fiber optic communications system, the header comprising:
   a light source;
   an optical fiber for receiving a light from the light source and for separating the light into a first light component that is substantially transmitted through the optical fiber and a second light component that substantially passes through the optical fiber;
   a medium for transmitting the second light component from the optical fiber; and
   a light detector for receiving the second light component from the medium and for providing an output signal based upon the intensity of the second light component.

33. The header of claim 32 wherein the medium is a prism.

34. The header of claim 33 wherein the medium is a glass plate.

35. The header of claim 32 wherein the medium is an adhesive.

36. The header of claim 32 wherein the medium comprises an adhesive portion and a glass portion.

37. The header of claim 36 wherein the glass portion includes a prism.

* * * * *